Dec. 16, 1924.

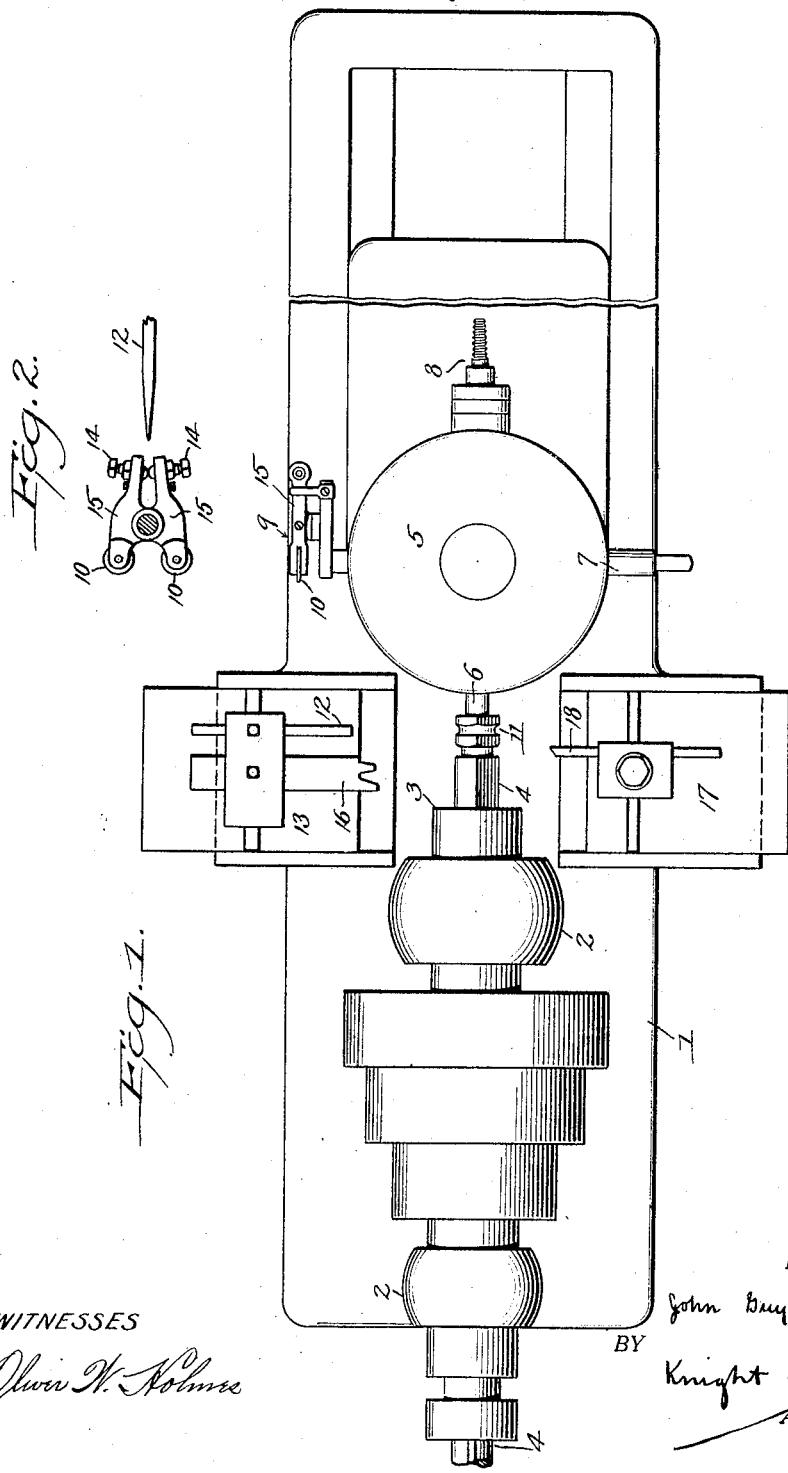

1,519,125

J. G. FURLAN

METHOD OF MAKING LOCK NUTS

Filed April 2, 1923   2 Sheets-Sheet 2

WITNESSES

INVENTOR
John Guy Furlan
BY
Knight Bro
ATTORNEYS

Patented Dec. 16, 1924.

1,519,125

UNITED STATES PATENT OFFICE.

JOHN GUY FURLAN, OF NEW YORK, N. Y., ASSIGNOR TO FURLAN NUT MACHINERY CORPORATION, OF NEW YORK, N. Y., A CORPORATION OF NEW YORK.

METHOD OF MAKING LOCK NUTS.

Application filed April 2, 1923. Serial No. 629,442.

*To all whom it may concern:*

Be it known that I, JOHN GUY FURLAN, a subject of the King of Italy, but having declared my intention of becoming a citizen of the United States, a resident of the city, county, and State of New York, have invented certain new and useful Improvements in Methods of Making Lock Nuts, of which the following is a specification.

My invention relates to a method of making lock nuts that are characterized by two groups of threads between which is a circumferential groove forming a reduced cross section at which the nut is stretched or expanded to displace the two groups of threads axially so that they will be sufficiently out of helical alignment to form a lock nut.

A primary object of my invention is to produce a lock nut of this description by a method that will provide in effect a standard nut having a lock nut feature, in a cheap, simple and expeditious manner, while at the same time giving accurate and uniform results, and to provide a lock nut which may be used again and again without injuring the thread of either the bolt or the nut.

My invention comprises forming a circumferential groove in the nut and after the thread has been cut expanding the nut by applying lateral pressure to one or both side walls of the groove in such a manner and by such devices as will cause a displacement of the threads on one side of the groove from those on the other side without reducing the diameter of the threaded part.

A further object of my invention is to effect the transformation of an ordinary nut into a lock nut by a method that will obtain accuracy with the minimum expenditure of power and to this end my invention comprises a step of expanding the nut axially by cold rolling the sides of a circumferential groove.

Another object of my invention is to produce a lock nut along with the ordinary steps of making a standard nut and to this end my invention further comprises a method of forming a standard nut into a lock nut by such steps as can be simultaneously carried on with the steps generally used in manufacturing nuts.

Figure 3:
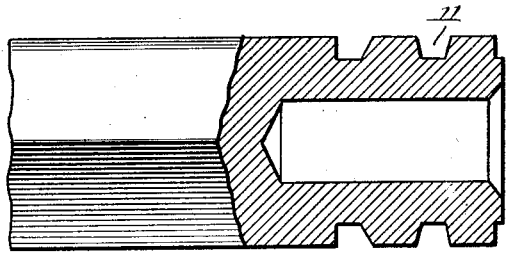
Figure 4:
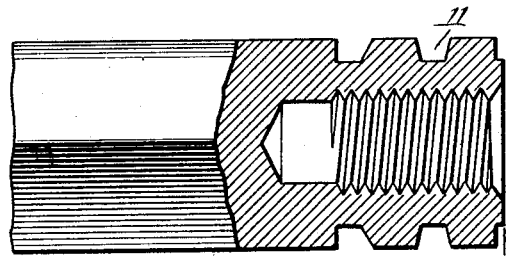
Figure 5:
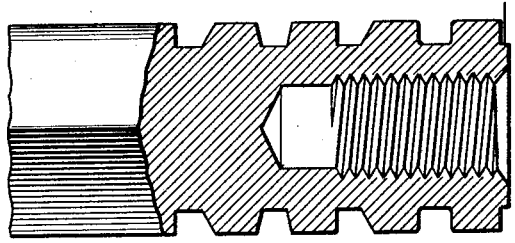
Figure 6:
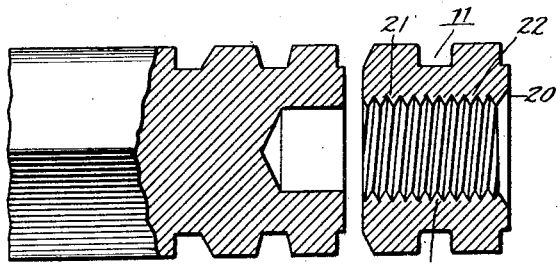
Figure 7:
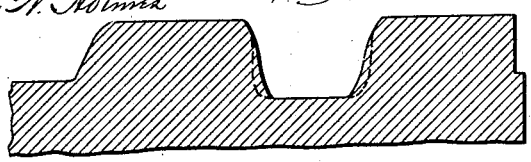

Figure 1 is a plan view of a hollow spindle turret lathe set up with tools appropriate for carrying out my method, Figure 2 is a side view of the expanding attachment shown in plan in Figure 1, Figure 3 is a partial section of the end of a stock bar showing the first operation, Figure 4 is a similar view after the second operation, Figure 5 is a similar view after the third operation, Figure 6 shows the completion of the fourth operation of cutting off, and Figure 7 is an enlarged view showing in section the shape of the annular groove before and after expansion.

Referring first to Figure 6, there is shown a lock nut 20 that it is proposed to make by the method herein described. The nut is characterized by two groups of threads 21 and 22 with a connecting thread or threads 23, in the mid portion, which has been distorted or expanded, so that the two end groups are no longer in helical alignment, but are displaced, axially, to just the right amount to give the effect of a lock nut, when applied to a bolt. To produce a nut of this kind a circumferential groove 11 is turned in the periphery of the nut, which groove may be cut before or after tapping the thread, and then the two sides of the nut are forced apart so as to permanently stretch the constricted neck at the base of the groove. To accomplish this stretching without resorting to great strains, and without impairing the axial alignment or causing any reduction in the diameter of the intermediate section, which would be fatal to the efficiency of the nut is the object of my invention.

I have found that such desirable results may be obtained by applying said pressure to the lateral side walls of the groove and I apply this pressure by means of a cold rolling action, which, acting as it does on only two opposite points at a time requires but little power, and by continuing round and round puts a uniform strain upon all parts of the nut. Furthermore, by acting only sidewise, no contraction occurs in the constricted neck at the base of the groove. An additional useful attribute of the rolling method for expanding such nuts resides in the facility with which such a method cooperates with the usual steps of forming such nuts on a lathe it being essentially a turning function. This being the case I am enabled to interpolate the expanding operation as a step to be carried out simultaneously with steps commonly used in the manufacture of nuts.

While the various steps of the method may be carried out independently and in the case of larger sizes will be so performed, a particular manner of executing the method by means of an automatic turret lathe or screw machine will now be described as an illustration of one preferred form of carrying out the invention.

Referring to Figure 1, 1 is the frame of the lathe, 2 is the head stock, and 3 the hollow spindle thereof provided with the customary chuck thru which may be passed a suitable stock bar 4. At 5 is shown a turn table turret provided at 6 with a gaging stop against which the bar 4 is brought to bear each time that it is fed forward thru the hollow spindle, such being the customary first operation of a turret lathe. The turret being then retreated is brought forward again to work with the drill 7 in operative position for the second operation. In the third operation the tap 8 is caused to cut the thread in the hole previously drilled in the end of the bar. For the fourth operation the expanding tool 9 is brought into position so that the expanding rollers 10 thereof are aligned in the groove 11 that has been previously formed in the rod. The expanding is accomplished by means of an expanding wedge 12 mounted on the crossslide 13. The wedge 12 immediately after the forming tool 9 has been brought to its operative position so that the rollers 10 are in line with the groove 11 is forced by the slide to enter between the adjusting screws 14 on the rear of the rocker arms 15 with the result that the rollers 10 are forced into the groove and by a cold rolling action on the side walls of the groove cause the outer end of the bar to be swaged or expanded away from the main portion. Mounted on the same carriage 13 with the expanding wedge 12 is a groove forming tool 16 which forms the groove for the second nut simultaneously with the expansion of the first nut. This forming tool 16 is adapted to cut two grooves, the one nearest the end of the bar being for expansion purposes, and the other one having the functions of forming the bevelled head of the first nut and preliminarily facing the second nut. After the completion of the expanding and grooving operations, which as before stated are done simultaneously, the slide 13 is drawn back and also the turret, and slide 17 on the other side of the lathe carrying a cutting off tool 18 is advanced so as to enter the groove made by the end forming part of the grooving tool 16 and effect the severance of the nut from the bar. The clutch on the hollow spindle is then released and the turret brought around so that stop 6 is again in proper position to bring the bar at rest at the right distance whereupon the chuck again grips the bar and the process is repeated.

The various steps are shown clearly in Figures 3, 4, 5, and 6. Figure 3 shows the end of the bar drilled as in first operation with the circumferential grooves that had already been formed during the process of making the preceding nut as hereinafter described. Figure 4 shows the bar after the second operation. Figure 5 shows the completion of the third operation and indicates how the expanding groove has been cold rolled by the rollers 10 impinging on the inclined walls of the groove 11 as shown in Figure 4, the metal of said walls being thereby swaged or spun into approximate parallelism, and the constricted part of the nut stretched so that the group of threads to the right of the groove are slightly displaced out of helical alignment with the group of threads to the left of the groove. Simultaneously with this operation of rolling the groove, the two grooves for the next nut to be cut are formed. Figure 6 shows the completion of the next operation in which the nut is cut off from the end of the bar.

It will be evident from the above description that no additional time or no additional motions or operations have been added to the usual operations of making ordinary nuts and since the nut is revolving anyway, the method proposed of expanding the same by cold rolling is peculiarly adapted to economical production. It should be pointed out here that this spinning or cold rolling must be applied only to the side walls of the groove as otherwise the internal diameter of the neck portion of the nut might be reduced. Such reduction in the diameter of the neck portion would be fatal to the efficiency of the nut as a lock nut as it would cause such an injury to the threads as to prevent reapplication in case of removal.

In Figure 7 is shown on a large scale a section thru the expanding groove in which the full line indicates the contour of the groove previous to the rolling operation and the dotted lines its contour after the rolling operation. To one familiar with the art of cold rolling, it will be understood that this transformation from the inclined to the substantially parallel side walls really takes place gradually and molecularily and that by proper adjustments the limitations between maximum and minimum variations from a given standard can be reduced to very low limitations with the result that the lock nuts produced by this method will be all substantially uniform in their behavior.

While I have described a preferred method of making my lock on an automatic screw machine, it is to be understood that the steps of the method may be performed independently by different tools.

I claim:—

1. The method of producing a lock nut in which two groups of threads are displaced out of helical alignment while remaining coaxial, comprising the steps of first cutting the thread and then applying pressure symmetrically to the metal intermediate the two groups of threads to cause an axial expansion of the metal at the intermediate point.

2. The method of producing a lock nut comprising the steps of forming the thread, and cutting a circumferential groove in the outer periphery, and then applying pressure to the sides of the groove to displace along the common axis the threads on one side of the groove out of helical alignment with those on the other side.

3. The method of producing a lock nut comprising the steps of forming the thread and cutting a circumferential groove, with a group of threads on each side of the groove and subsequently displacing the two groups of threads in an axial direction without changing their coaxial relation by cold rolling the side walls of the groove.

4. The method of producing a lock nut comprising the steps of forming the thread and cutting a circumferential groove with inclined side walls with a group of threads on each side of the groove and subsequently applying a spreading tool inwardly against the inclined wall to effect a displacement parallel to the axis.

5. The method of producing a lock nut from a bar comprising the steps of drilling and tapping the bar and cutting a circumferential groove in the outer periphery, then applying pressure to the lateral walls of the groove to expand the outer end of the nut away from the bar to effect a displacement parallel to the bar, and finally cutting off the nut from the bar.

6. The method of producing successive lock nuts from a bar comprising the operations of drilling, tapping and forming the nut and the added operations of cutting a circumferential groove and expanding the nut the added operations being performed within the time of the other operations.

JOHN GUY FURLAN.